United States Patent [19]

Yuuchi et al.

[11] Patent Number: 4,939,593

[45] Date of Patent: Jul. 3, 1990

[54] STILL PICTURE PROCESSING APPARATUS FOR A STILL CAMERA

[75] Inventors: Takahiro Yuuchi, Katano; Tatsuo Tanaka, Tsuzuki, both of Japan

[73] Assignee: Sanyo Electric Co., Ltd., Moriguchi, Japan

[21] Appl. No.: 166,341

[22] Filed: Mar. 10, 1988

[30] Foreign Application Priority Data

Mar. 11, 1987 [JP] Japan .................................. 62-55567
Oct. 20, 1987 [JP] Japan .......................... 62-160241[U]

[51] Int. Cl.$^5$ ............................................. H04N 5/91
[52] U.S. Cl. .................................. 360/11.1; 358/336;
358/909; 360/35.1; 369/58
[58] Field of Search .................. 358/213.25, 313, 320,
358/336, 337, 342, 906, 909; 360/9.1, 11.1, 35.1,
36.1, 36.2; 369/50, 54, 58, 124

[56] References Cited

U.S. PATENT DOCUMENTS

| | | | |
|---|---|---|---|
| 4,287,539 | 9/1981 | Bixby et al. | 360/35.1 X |
| 4,290,087 | 9/1981 | Bixby et al. | 360/35.1 X |
| 4,417,285 | 11/1983 | Mes | 360/35.1 X |
| 4,460,927 | 7/1984 | Roméas | 360/35.1 X |
| 4,647,976 | 3/1987 | Nakagaki et al. | 358/909 X |
| 4,746,993 | 5/1988 | Tada | 358/909 X |
| 4,775,898 | 10/1988 | Akabane et al. | 360/35.1 X |
| 4,816,929 | 3/1989 | Bradley et al. | 360/35.1 X |

FOREIGN PATENT DOCUMENTS 59-2227 1/1984 Japan .

OTHER PUBLICATIONS

Tanaka et al., An Electronic Still Camera System, IEEE Transactions on Consumer Electronics, vol. CE-32, No. 3, 8/86, pp. 345-354.
Kihara et al., The Electronic Still Camera A New Concept in Photography, IEEE Transactions on Consumer Electronics, vol. CE-28, No. 3, 8/82, pp/ 325-331.
Aizawa et al., High Resolution Electronic Still Camera with Two MOS Imagers, IEEE Transactions on Consumer Electronics, vol. CE-31, No. 3, 8/85, pp. 425-429.
"Electronic Still Camera Reproduction Method by IC Memory", 1986, Denki Kankei Gakkai Kansai Shibu Rengo Taikai, by Sanyo Electric Co., Ltd.
"A Digital Noise Reducer for Encoded NTSC Signals", McMann et al., SMPTE Journal, vol. 87, No. 3, Mar., 1978, pp. 129-133.
"Specifications of Still Video Floppy Systems", The Electronic Still Camera Conference, pp. 1-82.
Nikkei Electronics, Jul. 2, 1984, pp. 80-85.
Nikkei Electronics, Jan. 27, 1986, pp. 92-94.

Primary Examiner—Vincent P. Canney
Assistant Examiner—W. R. Young
Attorney, Agent, or Firm—Armstrong, Nikaido, Marmelstein, Kubovcik & Murray

[57] ABSTRACT

In processing a video signal reproduced from a track of a magnetic disc (10), if the reproduction video signal, from one track of the frame recorded on two adjacent tracks, is stored in a memory (34), then the control circuit (20) determines whether the memory (34) should be used as a field memory or a frame memory based on a field/frame discriminating signal reproduced from the reproduced track. Therefore, error which occurs when only one of the two tracks is erased, can be prevented.

12 Claims, 10 Drawing Sheets

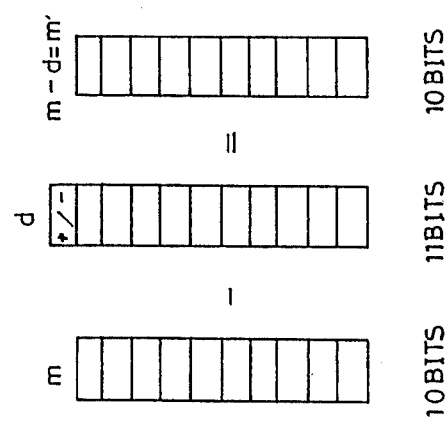
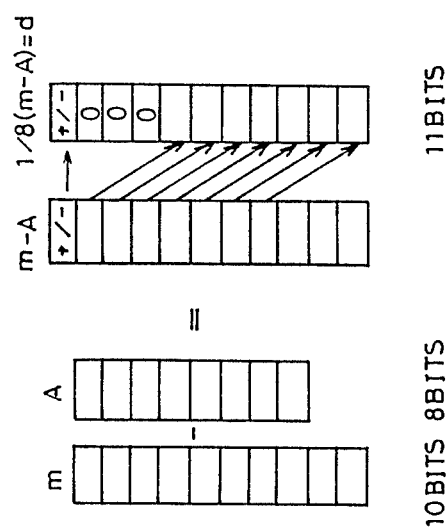

STILL PICTURE PROCESSING APPARATUS FOR A STILL CAMERA

BACKGROUND OF THE INVENTION

1. Field of the Invention

The present invention relates to a still picture signal processing apparatus and, more specifically, it relates to a still picture signal processing apparatus for an electric still camera.

2. Description of the Prior Art

Recently, various electronic still camera systems have been proposed which convert the image of an object into electric signals by an image pickup device, record the same on a magnetic disc called a floppy disc and display a still reproduction image on a monitor TV. These electronic still camera systems are disclosed in (1) Nikkei Electronics, July 2, 1984 pp. 80-85
(2) Aizawa, et al.: HIGH RESOLUTION ELECTRONIC STILL CAMERA WITH TWO MOS IMAGERS, IEEE transactions on Consumer Electronics, Vol. CE-13, No. 3, August 1985 pp. 425-429
(3) Tanaka, et al.: AN ELECTRONIC STILL CAMERA SYSTEM, IEEE Transactions on Consumer Electronics, Vol. CE-32, No. 3, Aug. 1986 pp. 345-353
(4) Kihara et al.: THE ELECTRONIC STILL CAMERA A NEW CONCEPT IN PHOTOGRAPHY, IEEE Transactions on Consumer Electronics Vol. CE-28, No. 3, August 1982 pp. 325-321

As disclosed in the above mentioned publications, in an electronic still camera, the luminance signal and the color difference line sequential signal are respectively FM modulated and frequency multiplied, whereby one field is recorded on one track. For a frame image, the recording is carried out on two adjacent tracks. However, both the field image and the frame image exist together on the same disc. The discrimination between the two is achieved by a 2 bit field/frame discriminating signal included in the DPSK modulation data code which is multiply recorded in the video signal (see the above publication (1)). The processing of the reproduction signal of the magnetic disc recorded by the above mentioned electronic still camera is carried out by a still picture signal processing apparatus provided in the reproduction apparatus. The still picture signal processing apparatus temporarily stores the video signal reproduced from the magnetic disc in a memory and repeatedly reads the stored content of the memory, thereby supplying the still picture signal to the monitor TV.

Meanwhile, in order to save the tracks on the magnetic disc, sometimes one of the two tracks, on which the frame recording is carried out, is erased and a new still picture image is recorded on that erased track. In this case, the relation of the field/frame discriminating signal may be mixed with each other between the remaining one track of the frame recording and the succeeding track of the new still picture image. Therefore, in a conventional still picture signal processing apparatus, there is a possibility of errors in reproducing such a magnetic disc. For example, the track of the frame recording which is not erased and the succeeding one track of the new still picture image are sometimes discriminated as a frame image and both are mixed and reproduced to be displayed on the monitor TV. In that case, still picture images completely independent of each other are mixed and displayed on the monitor TV. Therefore, the user watches a meaningless image, wondering whether the reproduction apparatus is out of order.

SUMMARY OF THE INVENTION

Therefore, an object of the present invention is to provide a still picture signal processing apparatus which is capable of correctly reproducing a still image without errors regardless of the relationship between the field/frame discriminating signal recorded on the adjacent tracks.

Briefly stated, in the present invention, when the processing of the reproduction video signal, from one track of a frame recorded on two tracks, is completed and the video signal from the adjacent track is being processed, whether the memory should be used as the field memory or as the frame memory is controlled based on the field/frame discriminating signal reproduced from that track.

According to the present invention, even if only one of the frame recorded two tracks is erased, the processing of the reproduction video signals of each of the track can be carried out without error whether a new video signal is field recorded or frame recorded on the erased track or the track remains erased.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 9, (a, b), illustrates the operation of the circuit shown in FIG. 8;

DESCRIPTION OF THE PREFERRED EMBODIMENTS

Figure 1:
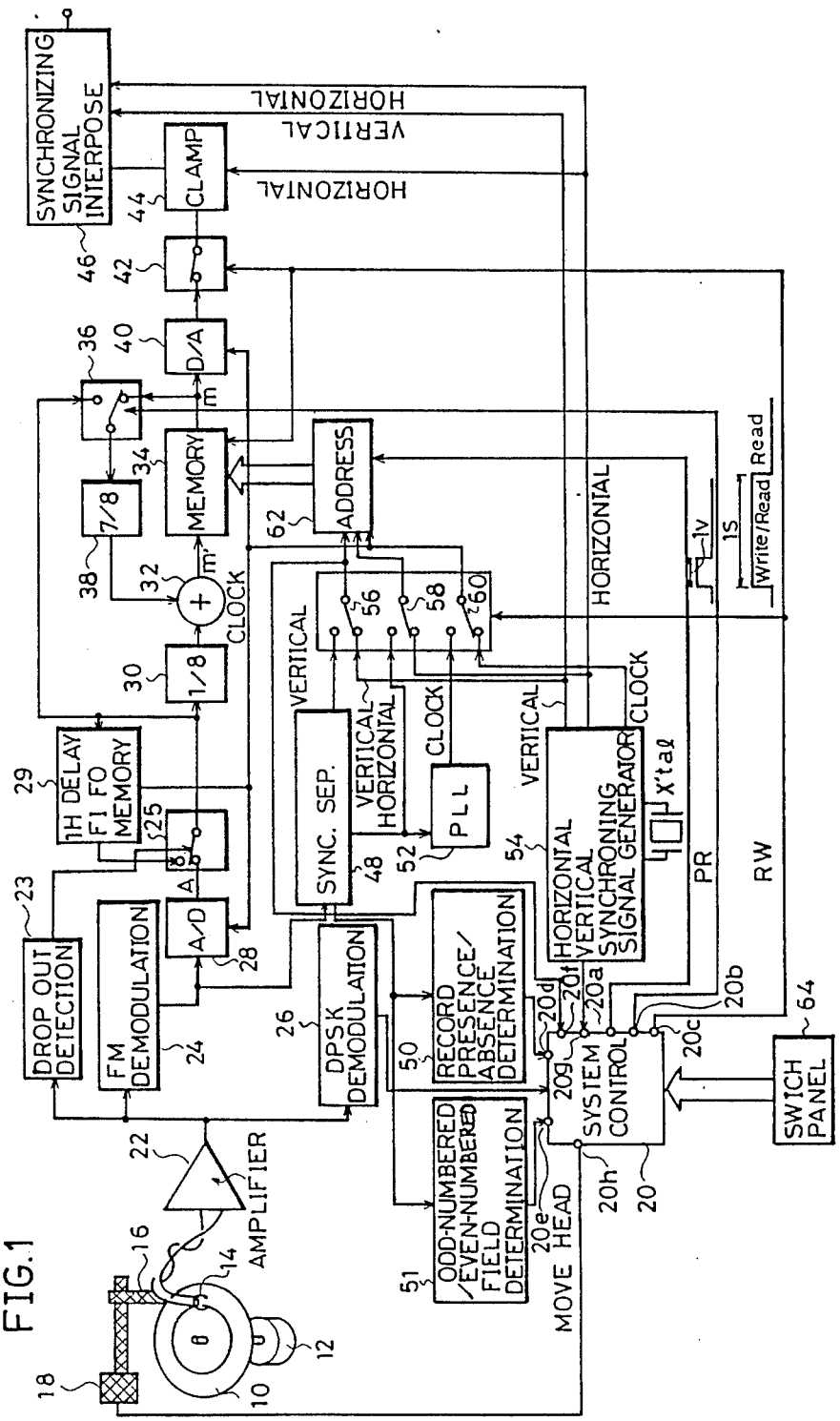
FIG. 1 is a block diagram showing one embodiment of the present invention.

First, one embodiment of the present invention will be described with reference to FIG. 1. In the figure, fifty concentric tracks are formed on a known magnetic disc 10 which is called a floppy disk and the video signals of one field is recorded on one track. For field recording, the video signals for one field are recorded on one track, while for frame recording, the video signals for one frame are recorded on two adjacent tracks.

The discrimination between frame recording and field recording is carried out by the field/frame discriminating signal included in the DPSK modulation data code as described in the foregoing.

A motor 12 for rotating the magnetic disc, a magnetic head 14, a head supporting portion 16 and a head access motor 18 are provided in association with the magnetic disc 10. The head access motor 18 is to move the magnetic head 14 to a prescribed track according to the control signal from the output terminal 20h of the system control circuit 20.

The amplifier 22 is provided to amplify the output of the magnetic head 14 and the output thereof is applied to the dropout detection circuit 23, FM demodulation circuit 24 and DPSK demodulation circuit 26. The dropout detection circuit 23 detects the dropout generated in the reproduction video signal and its output is applied to the switch 25 as a switching control signal. The DPSK demodulation circuit 26 demodulates the DPSK modulation data code included in the reproduction video signal and its output is applied to the system control circuit 20. The DPSK demodulation circuit 26 outputs signals different from each other at every reproduction (every rotation) when that track is reproduced when no DPSK modulation data code is recorded. Therefore, the system control circuit 20 uses the output data of the DPSK demodulation circuit 26 as the correct data when the same data is reproduced for several rotations of the magnetic disc 10. Alternatively, the DPSK demodulation circuit may comprise a data presence/absence detection circuit to transmit the demodulated data to the system control circuit 20 only when the DPSK modulation data is present. The FM demodulation circuit 24 demodulates the reproduction video signal and its output is applied to the A/D converter 28. The A/D converter 28 is, for example, an 8 bit A/D converter and converts an analog reproduction video signal into an 8 bit digital video signal A. The switch 25 switches and draws out the output of the A/D converter 28 or the output of the FIFO (first in first out) memory 29 for 1H (1 horizontal scanning period) delay in response to the output of the dropout detection circuit 23. The 1H delay FIFO memory 29 is to delay the output of the switch 25 for 1H so as to output the 1H preceding video signal. The ⅛ multiply circuit 30 multiplies the magnitude of the digital video signal by ⅛ which is input through the switch 25. The adder 32 adds the video signal from the ⅛ multiply circuit 30 and the video signal from the ⅞ multiply circuit 38 and the output m' is applied to memory 34. The memory 34 is a memory of, for example, 10 bit frame capacitance for one pixel for storing the video signal m' from the adder 32. The memory 34 comprises first and second field memory regions (one is the memory region for the odd-numbered fields and the other is the memory region for the even-numbered fields).

The switch 36 switches and outputs the video signal m output from the memory 34 or the video signal A input through the switch 25, and the output thereof is applied to the ⅞ multiply circuit 38. The switching of the switch 36 is controlled by a control signal PR which is output from the output terminal 20b of the system control circuit 20. When the switch 36 is connected to the memory 34, the video signal m of the memory 34 and the input video signal A from the A/D converter 28 are mixed with the proportion of 1:7 in the adder 32 and the result is again stored in the memory 34. When the switch 36 is connected to the switch 25, the adder 32 adds the ⅛ of the input video signal A to the ⅞ of the same, substantially outputting the input video signal A. Therefore, in this case the memory 34 substantially stores the original input video signal A.

The D/A converter 40 is, for example, a 10 bit input D/A converter which converts the digital video signal m output from the memory 34 into an analog video signal, and its output is applied to the switch 42. The switch 42 has its open/close controlled by a control signal RW output from the output terminal 20c of the system control circuit 20. Namely, while the still picture signal processing apparatus of FIG. 1 is carrying out the noise reducing operation, the switch 42 is open, and it closes thereafter. The output of the switch 42 is applied to the clamp circuit 44. The clamp circuit 44 clamps the video signal at a constant level based on a horizontal synchronizing signal from a horizontal.vertical synchronizing signal generator which will be described later, and the output of the circuit 44 is applied to the synchronizing signal interposing circuit 46. The synchronizing signal interposing circuit 46 interposes the horizontal synchronizing signal and the vertical synchronizing signal from the horizontal.vertical synchronizing signal generator 54 into the input video signal.

The synchronizing signal separating circuit 48 extracts a synchronizing signal from the output of the FM demodulation circuit 24 and outputs a (first) horizontal synchronizing signal and a (first) vertical synchronizing signal. The recording presence/absence determining circuit 50 detects whether a synchronizing signal is output or not from the synchronizing signal separating circuit 48 (the presence/absence of the synchronizing signal) so as to determine the presence/absence of the recording of the video signal on the reproduction track of the magnetic disc 10. The output of the recording presence/absence determining circuit 50 is applied to the input terminal 20d of the system control circuit 20. The odd-numbered/even-numbered field determining circuit 51 determines whether the reproduction track of the magnetic disc 10 is the odd-numbered field or the even-numbered field based on the synchronizing signal from the synchronizing signal separating circuit 48. The output of the odd-numbered/even-numbered field determining circuit 51 is applied to the input terminal 20e of the system control circuit 20. The PLL circuit 52 is phase controlled by the horizontal synchronizing signal from the synchronizing signal separating circuit 48 and outputs $4f_{sc}$ ($f_{sc}$ is color subcarrier frequency) (first) clock signal, for example. The horizontal.vertical synchronizing signal generator 54 contains a $4f_{sc}$ reference oscillator and outputs a (second) clock signal a (second) horizontal synchronizing signal and a (second) vertical synchronizing signal.

The switch 56 selects and outputs either the above mentioned first vertical synchronizing signal or the second vertical synchronizing signal and its output is applied to the address circuit 62 and to the input terminal 20f of the system control circuit 20. The switch 58 selects and outputs either the above described first horizontal synchronizing signal or the second horizontal synchronizing signal and its output is applied to the address circuit 62. The switch 60 selects and outputs either the above mentioned first clock signal and/or second clock signal and its output is applied to the address circuit 62, A/D converter 28, 1H delay FIFO memory 29 and to the D/A converter 40. These switches 56, 58 and 60 are open/close controlled by the control signal RW which is output from the output terminal 20c of the system control circuit 20. The address circuit 62 designates the address of the memory 34 in response to the input clock signal, horizontal synchronizing signal and the vertical synchronizing signal.

The switch panel 64 is provided with various control switches which are operated by the user and applies various instructions to the system control circuit 20 in response to the operation of these operation switches.

The operation of the embodiment shown in FIG. 1 will be hereinafter described with reference to the flowcharts of FIG. 2A, 2B and FIG. 3.

First, the operation in which the video signal are reproduced from the field recorded tracks will be described. In this case, the system control circuit 20 controls the head access motor 18 according to the instruction from the switch panel 64 so as to move the magnetic head 14 to the prescribed track. By so doing, the designated track is accessed (step S1). The reproduction output from the magnetic head 14 is input to the FM demodulation circuit 24 through the amplifier 22, and is FM demodulated to be the baseband video signal. The video signal is converted into the digital signal in the A/D converter 28 and thereafter applied to the ⅛ multiply circuit 30 and to the switch 36 through the switch 25. Meanwhile, the switch 25 is usually switched to the A/D converter 28. However, it is switched to the 1H delay FIFO memory 29 when the dropout detection circuit 23 detects the dropout of the reproduction video signal. Consequently, the 1H preceding video signal without a dropout is applied to the ⅛ multiply circuit 30 and to the switch 36. The output of the FM demodulation circuit 24 is input to the synchronizing signal separating circuit 48 and the synchronizing signal thereof is separated and extracted. The recording presence/absence determining circuit 50 detects whether the video signal is recorded or not in the track which is currently being accessed, based on whether the synchronizing signal is output or not from the synchronizing signal separating circuit 48. On this occasion, the system control circuit 20 determines that the signal is "recorded" based on the output of the recording presence/absence determining circuit 50 which is input to the input terminal 20d (step S2). If nothing is recorded, the process ends since there is no need for signal processing. Meanwhile, the DPSK demodulation circuit 26 demodulates the DPSK modulation data code which is multiply recorded on the reproduction video signal (step S3). The output of the DPSK demodulation circuit 26 is applied to the system control circuit 20. On this occasion, the system control circuit 20 determines that it is field recording based on the 2 bit field/frame discriminating signal included in the output of the DPSK demodulation circuit 26 (step S4).

A brief description will be given of the field/frame discriminating signal. The field/frame discriminating signal indicates by 2 bit logic value whether the track is field recorded or frame recorded and, for frame recording, whether the track is the outer track or the inner track. For example, the track of the field recording is indicated by "0, 0", the outer track in the frame recording is indicated by "0, 1" and the inner track of the frame recording is indicated by "1, 0".

Thereafter, the system control circuit 20 outputs a control signal from the output terminal 20a to the address circuit 62, thereby controlling the address circuit 62 so that the address circuit 62 designates the address of the even-numbered field memory region in the memory 34 (step S5). Therefore, in this case the memory 34 functions as a field memory.

Subsequently, the system control circuit 20 carries out the subroutine process shown in the step S6. The details of the subroutine process are shown in FIG. 3. First, the system control circuit 20 sets the control signal RW, which is output from the output terminal 20c at a high level. Consequently, the memory 34 is set in the writing/reading mode. The switch 42 is open. The switches 56 and 58 are switched to the synchronizing signal separating circuit 48 and the switch 60 is switched to the PLL circuit 52. In the writing/reading mode, the still picture signal processing apparatus operates as a noise reducer. The details will be described in the following. First, the system control circuit 20 determines whether a first vertical synchronizing signal is input or not to the input terminal 20f (step S102). Subsequently, the control signal PR which is output from the output terminal 20b is set at a high level (step S103). Consequently, the switch 36 is switched to the switch 25. The number of circulations N of the memory 34 is set at 0 (step 104), and the circuit 20 stands by in that state until the next vertical synchronizing signal is input (step S105). On this occasion, since the switch 36 is switched to the switch 25, the adder 32 adds the ⅛ multiplied output of the switch 25, namely, the output A of the A/D converter 28 multiplied by the ⅛ multiplier circuit 30 and the ⅞ multiplied output A multiplied by the ⅞ multiply circuit 38. Therefore, the output m' of the adder 32 becomes almost the same as the original video signal A. The output m' of the adder 32 is successively written in the memory region for the even-numbered fields designated by the address circuit 62. Thereafter, when the input of the next vertical synchronizing signal is detected in step S105, the number of circulations N of the memory 34 is incremented by +1 (step S106). The control signal PR is inverted to the low level (step S107). Consequently, the switch 36 is switched to the memory 34. Therefore, the video signal read from the memory region for the even-numbered fields of the memory 34 is applied to the ⅞ multiply circuit 38 through the switch 36. Meanwhile, since the address circuit 62 is controlled by the synchronizing signal separated from the input video signal, the position on the image frame of the video signal read from the memory 34 and that of the video signal reproduced from the track of the magnetic disc 10 at this time coincide with each other. The video signal read from the memory 34 is multiplied by the ⅞ multiply circuit 38 through the switch 36. The ⅞ multiplied video signal is added in the adder 32 to the input video signal A which is multiplied by ⅛ multiply circuit 30. The output m' of the adder 32 is again written in the memory region for the even-numbered fields in the memory 34. The rewriting operation of the memory 34 is repeated 60 times (step S108).

In this manner, by rewriting the video signal m of the preceding one field written in the memory 34 and the input video signal A added together with a prescribed proportion to the memory 34, the video signals of each of the pixel positions of one field are averaged, whereby the noise components having no relationship with the field can be reduced.

Figure 2A:
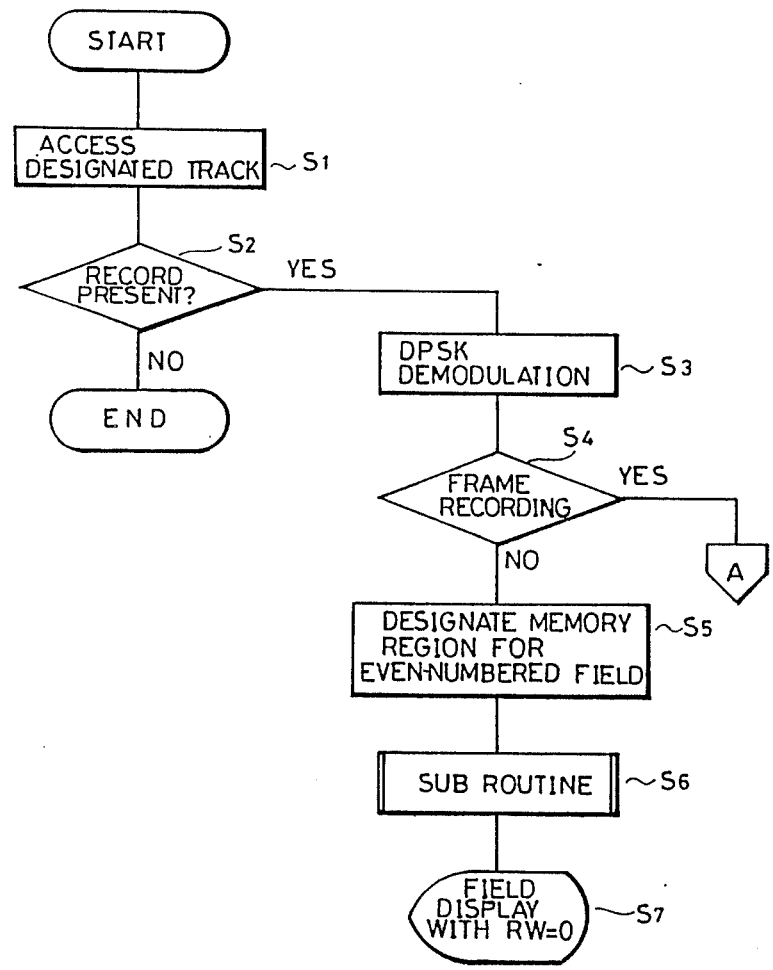
FIGS. 2A, 2B and 3 are flowcharts for illustrating the operation of the embodiment shown in FIG. 1.
Figure 3:
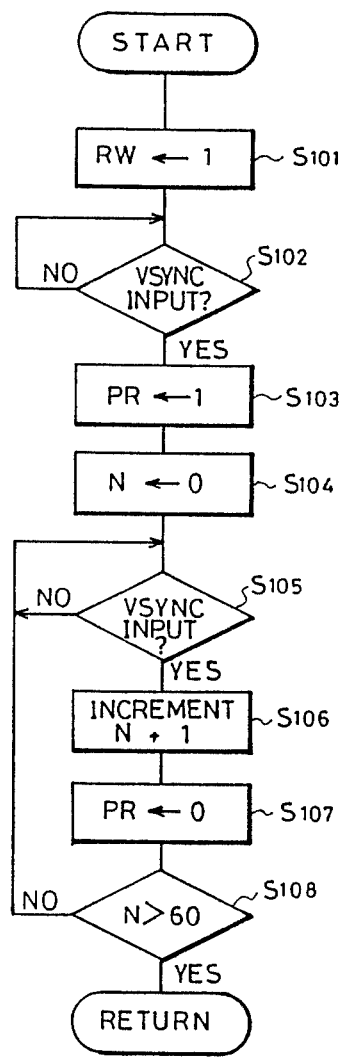

Now, returning to the flowchart shown in FIG. 2A, the system control circuit 20 sets the control signal RW which is output from the output terminal 20c at a low level (step S7). Consequently, the memory 34 is placed in a read only mode. The switch 42 is closed and the switches 56, 58 and 60 are respectively switched to the horizontal.vertical synchronizing signal generator 54. Therefore, the address circuit 62 designates the address of the memory 34 based on the clock signal and the synchronizing signal from the horizontal.vertical synchronizing signal generator 54. Therefore, the memory 34 is read according to a stable clock of the reference oscillator in the horizontal.vertical synchronizing signal generator 54, whereby the jitter components are eliminated. The output m of the memory 34 is converted into an analog video signal by the D/A converter 40. The analog video signal is applied to the clamp circuit 40 to be clamped through the switch 42 and thereafter, it is converted into the recorded video signal with the horizontal and vertical synchronizing signals from the horizontal.vertical synchronizing signal generator 54 being interposed therein. Meanwhile, since the memory 34 is in the read only mode on this occasion, the stored contents are not rewritten. Therefore, the video signals with the noise reduced are constantly read and output.

The next description will be for when the video signals are reproduced from the frame recorded tracks. In this case, after passing through the steps of accessing the designated track (step S1), determining the presence/absence of the recording of the video signal (step S2), and demodulating the DPSK modulation data code, the system control circuit 20 determines that signal is frame recorded based on the field/frame discriminating signal included in the DPSK modulation data code (step S4). Thereafter, it carries out the operation shown in FIG. 2B. First, the system control circuit 20 designates the memory region to be used for the address circuit 62 based on the odd-numbered/even-numbered field determining signal input to the input terminal 20e from the odd-numbered/even-numbered field determining circuit 51 (step S8). Thereafter, the subroutine process shown in FIG. 3 is carried out in step S9. Since this subroutine process has already been described in the foregoing, the description will be omitted. When the noise reducing operation in the subroutine process is completed, the system control circuit 20 controls the head access motor 18 so that it accesses the track of the other field constituting one frame (step S10). More specifically, when the field/frame discriminating signal included in the DPSK modulation data code of the track which was accessed the previous time is "0, 1", then the system control circuit 20 moves the magnetic head 14 to the inner track and, on the other hand, if it was "1, 0", it moves the magnetic head 14 to the outer track. Thereafter, the system control circuit 20 determines whether the video signal is recorded or not in the track which is being accessed based on the output of the recording presence/absence determining circuit 50 (step S11). If it is determined that no video signal is recorded, the system control circuit 20 sets the control signal RW output from the output terminal 20c at a low level and sets the memory 34 to the read only mode (step S12). Therefore, the video signal stored in either the odd-numbered field memory region or the even-numbered memory region is repeatedly read and output from the memory 34. Therefore, in this case, the still picture signal processing apparatus carries out the same operation as in the reproduction of a field recorded signal. This situation occurs when only one of the two tracks constituting 1 frame is erased and a new still picture has not yet been recorded on the erased track.

Meanwhile, if it is determined that video signals are recorded in the above mentioned step S11, the DPSK demodulation circuit 26 demodulates the DPSK modulation data code and applies the same to the system control circuit 20 (step S13). Accordingly, the system control circuit 20 confirms whether the track which is currently being accessed is the track that forms a pair with the last accessed track to constitute one frame based on the field/frame discriminating signal included in the DPSK data code (step S14). For example, if the track accessed last time is the outer track of the frame (in this case the field/frame discriminating signal is "0, 1"), and the track which is presently accessed is the inner track of the frame recording (in this case the field/frame discriminating signal is "1, 0"), then the track which is being accessed and the track which is accessed last time are determined to constitute a pair for one frame. Similarly, if the track which was accessed last time is the inner track of the frame recording and the track being accessed is the outer track of the frame recording, the track being accessed is determined to be the pair of the last accessed track, constituting one frame. On this occasion, if it is determined that the track being accessed is not the pair of the last accessed track, it proceeds to the above mentioned step S12 and the field reproduction process is carried out. This situation occurs when one track out of the two tracks constituting one frame is erased and a new reproduction image is recorded from that track. Meanwhile, when it is determined that the track which is accessed presently and the track which was accessed last time constitute a pair, the system control circuit 20 controls the address circuit 62 so as to switch the used memory region of the memory 34 (step S15). More specifically, if the memory region used for the track which was accessed last time is the memory region for the odd-numbered field, it is switched to use the memory region of the even-numbered field, and contrarily, if the memory region used for the track which was accessed last time is the memory region for the even-numbered field, it is switched to the memory region for the odd-numbered field. Subsequently, processing proceeds to step S16 and the subroutine process shown in FIG. 3 is carried out. Consequently, the reproduction video signal of the track which is accessed this time is noise reduced and recorded in the memory region designated in step S15. Therefore, the memory 34 is used as the frame memory. Thereafter, the system control circuit 20 sets the control signal RW which is output from the output terminal 20c at a low level (step S17). Consequently, the memory 34 is switched to the read only mode and the switch 42 is closed. Therefore, the video signals read from the memory 34 are output through the D/A converter 40, switch 42, clamp circuit and the synchronizing signal interposing circuit 46. In the read only mode, the system control circuit 20 switches the designation of the memory region in the memory 34 in response to the input at the terminal 20g every time a vertical synchronizing signal is output from the horizontal.vertical synchronizing signal generator 54. Therefore, the video signals of the odd-numbered fields and the video signals of the even-numbered fields are alternately read from the memory 34, whereby frame reproduction is effected.

Figure 2B:
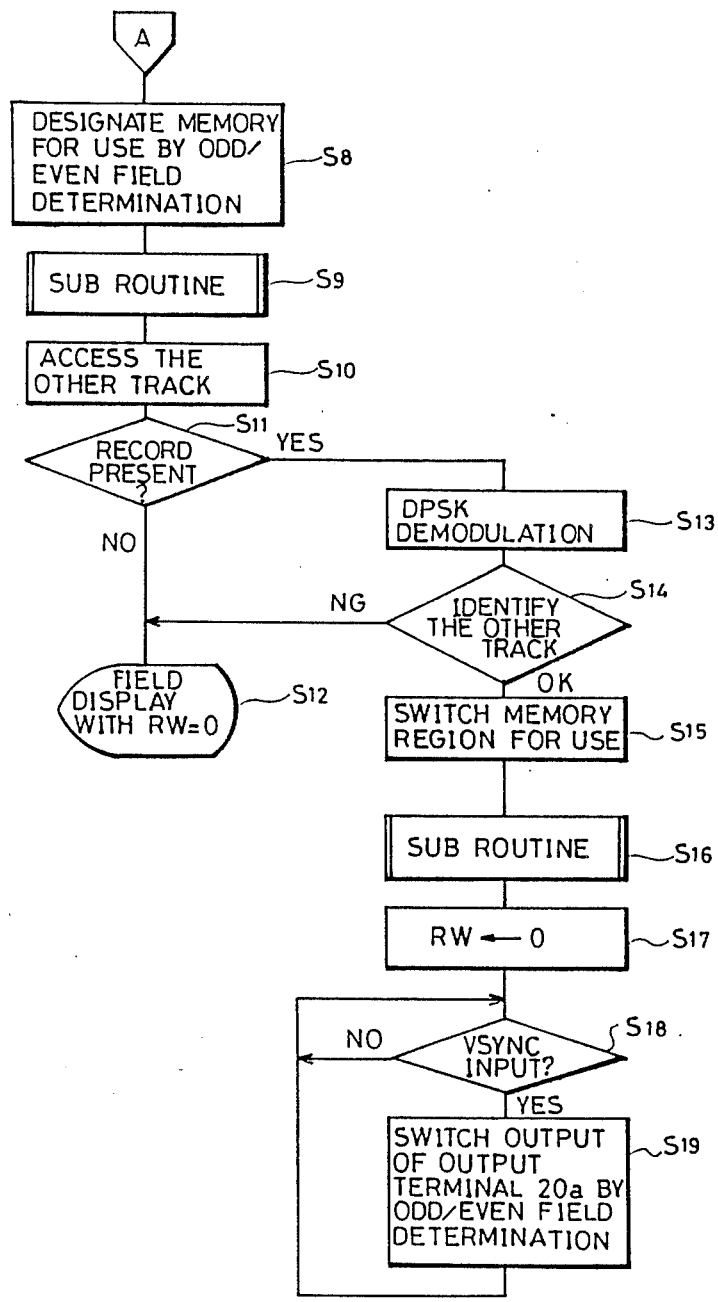
Figure 4:
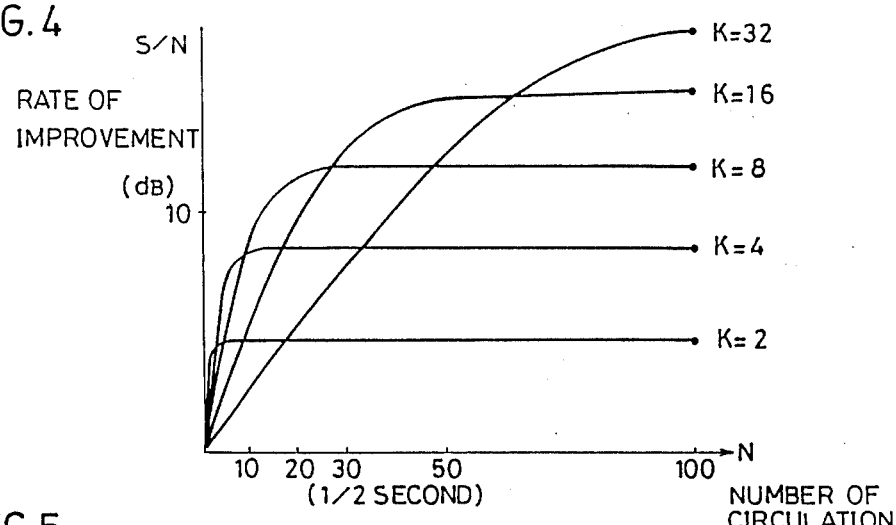
FIGS. 4 and 5 are graphs showing the noise reduction effect of the video signals in accordance with the embodiment shown in FIG. 1.
Figure 5:
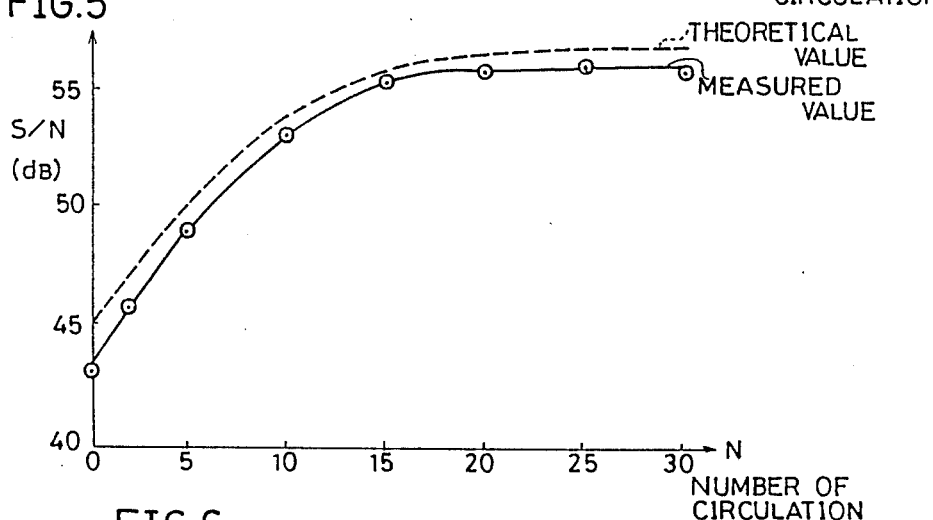

The theoretical value of the SN of the video signal provided by the still picture signal processing apparatus of FIG. 1 is shown in FIG. 4. In FIG. 4, the theoretical value of the improvement rate of the SN ratio is shown when the input video signal is multiplied by 1/K and the video signal from the memory 34 is multiplied by $(K-1)/K$. As shown, the rate of improvement can be enhanced if the value K is increased. However, since the input video signal is actually A/D converted by the A/D converter 28 as shown in FIG. 1, the rate of improvement does not become the ideal value due to the error in the A/D conversion. If the A/D conversion is for an 8 bit, there is no considerable effect in increasing K more than 8. FIG. 5 hows the actual SN ratio of the still picture signal processing apparatus shown in FIG. 1. In FIG. 5, the abscissa shows the number of circulations or the number of rewritings of the memory 34 while the ordinates shows the SN ratio.

Figure 6:
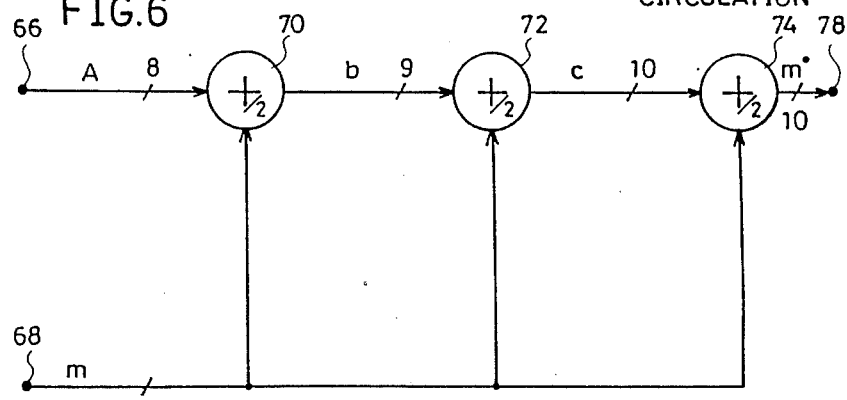
FIG. 6 is a schematic diagram showing one example of one of the circuits of the embodiment shown in FIG. 1.

The ½ multiply circuit 30 and the ⅞ multiply circuit 38 shown in FIG. 1 are usually formed of multipliers, which are expensive. Therefore, the ½ multiply circuit 30, ⅞ multiply circuit 38 and the adder 32 are preferably formed of the circuits shown in FIG. 6. In FIG. 6, adders 70, 72 and 74 are interposed in series between the input terminal 66 and the output terminal 78. An input terminal 68 is connected to each of the other input ends of the adders 70, 72 and 74. A video signal A, which is the output of the A/D converter 28, is applied to the input terminal 66 through the switch 25. A video signal m, which is read from the memory 34, is applied to the input terminal 68 through the switch 36. Each of the adders 70, 72 and 74 adds the respective one input and the other input and multiplies the sum by ½ to output the result. The video signal m′ which is to be applied to the memory 34 is output from the output terminal 78. The relationship between the video signal m′ from the output terminal 78, the input video signal A and the video signal m is represented by the following equation:

$$m' = \tfrac{1}{2}[\tfrac{1}{2}\{\tfrac{1}{2}(A+m)+m\}+m]$$

By varying the above equation, $$m' = \tfrac{1}{8}A + \tfrac{7}{8}m$$

This equation shows that the circuit shown in FIG. 6 has the same function as the ⅛ multiply circuit 30, ⅞ multiply circuit 38 and the adder 32 of FIG. 1.

Figure 7A:
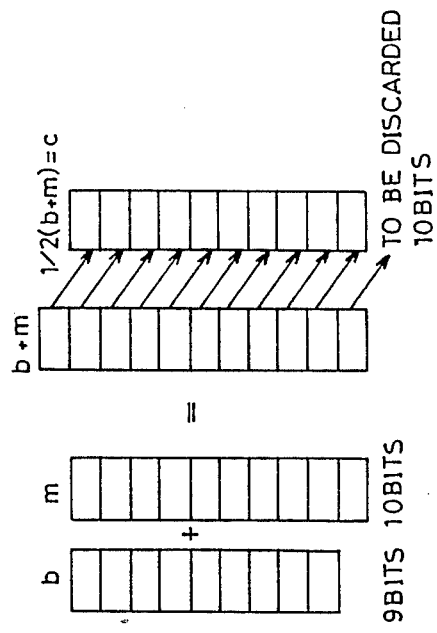
FIG. 7, (a, b, c), illustrates the operation of the circuit shown in FIG. 6.
Figure 7B:
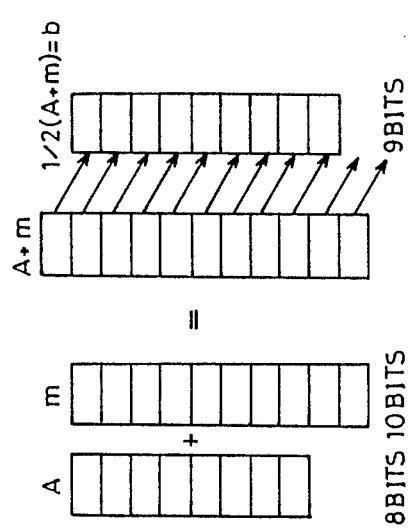
Figure 7C:
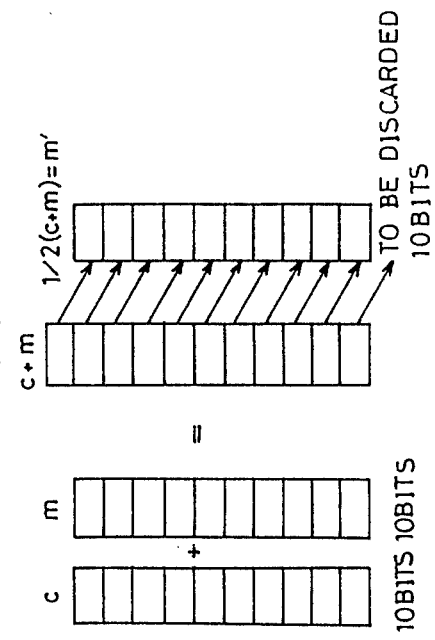

The operation of the circuit shown in FIG. 6 will be described in more detail. As shown in FIG. 7(a), the adder 70 adds the 8 bit input video signal A to the 10 bit video signal m and shifts this added value to a 1 bit lower order so as to make the output value b ½ of the added value. The 9 bit output value b is added to the video signal m in the adder 72 as shown in FIG. 7(b) and the added value is shifted to the 1 bit lower order so as to make the output value c ½ of the added value. This 10 bit output value c is added to the video signal m in the adder 74 and the added value is shifted to the 1 bit lower order as shown in FIG. 7(c) so as to make the output value m′ ½ of the added value.

As described above, since the circuit of FIG. 6 is constituted only by the functions of shifting and adding the data of the video signal, it can be structured easier and at a lower cost compared with the circuit constituted by the multipliers.

Figure 8:
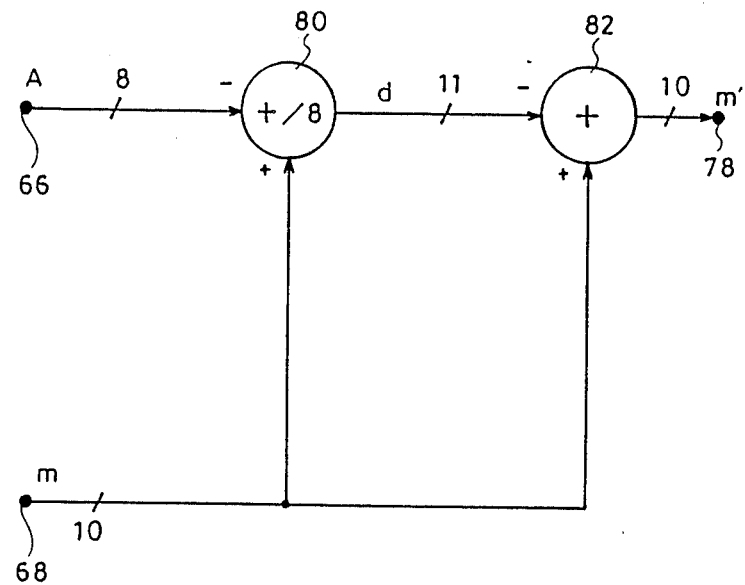
FIG. 8 shows another embodiment of one of the circuits of the embodiment shown in FIG. 1.

FIG. 8 shows another embodiment of the equivalent circuit of FIG. 6. In FIG. 8, portions corresponding to FIG. 6 are denoted by the same reference characteristics. In FIG. 8, two subtracters 80 and 82 are interposed in series between the input terminal 66 and the output terminal 78. The subtracter 80 outputs the difference between the input video signal A and the video signal m. The subtracter 80 multiplies the subtracted value by ⅛ to be output as the difference signal d. The subtracter 82 subtracts the difference signal d from the video signal m.

In FIG. 8, the relation between the video signal m′ from the output terminal 78 and the input video signal A and the video signal m is represented by the following equation:

$$m' = m - \tfrac{1}{8}(m - A)$$

By varying the above equation, $$m' = \tfrac{7}{8}m + \tfrac{1}{8}A$$

this shows that it has the same function as the circuit of FIG. 6. Namely, the subtracter 80 of FIG. 8 shifts the difference data (m−A) to the 3 bit lower order to make the value ⅛ as shown in FIG. 9(a). The subtracter 82 makes the video signal m′ by subtracting the difference signal d from the video signal m as shown in FIG. 9(b).

Since the circuit shown in FIG. 8 is constituted only by the functions of shifting and subtracting the data of the video signals, it can be structured easier and at a lower cost as in the circuit shown in FIG. 6 compared with the circuit structured by multipliers.

The still picture signal processing apparatus shown in FIG. 1 includes a further problem to be solved. The following will describe the problem and another embodiment to solve the problem.

In the still picture signal processing apparatus shown in FIG. 1, when the memory 34 is in the writing/reading mode, namely, when the noise reducing operation is carried out, the switch 42 is opened and no video signal is output outside. Therefore, during noise reducing no image is displayed on the monitor TV, leaving the user anxious. In order to solve this problem, the switch 42 may be eliminated so that the video signal is input in the writing/reading mode of the memory 34 to display the image on the monitor TV. However, even in that case, the following problem occurs when field recorded video signals are reproduced from the magnetic disc 10. More specifically, in reproducing the field recorded video signals, the process proceeds cyclically in the field period in the writing/reading mode of the memory 34 as described above and the process proceeds cyclically in the frame period in the following read only mode in the still picture signal processing apparatus of FIG. 1. Therefore, if the video signal read and output from the memory 34 in the writing/reading mode is the signal of odd-numbered or even-numbered one field, a skew of about 0.5 horizontal scanning line (0.5H) and jitter are generated at the junction between fields, that is, the switching between the odd-numbered field and the even-numbered field on one frame, causing disturbance of the reproduced image of the monitor TV at the time of switching the field.

Figure 11:
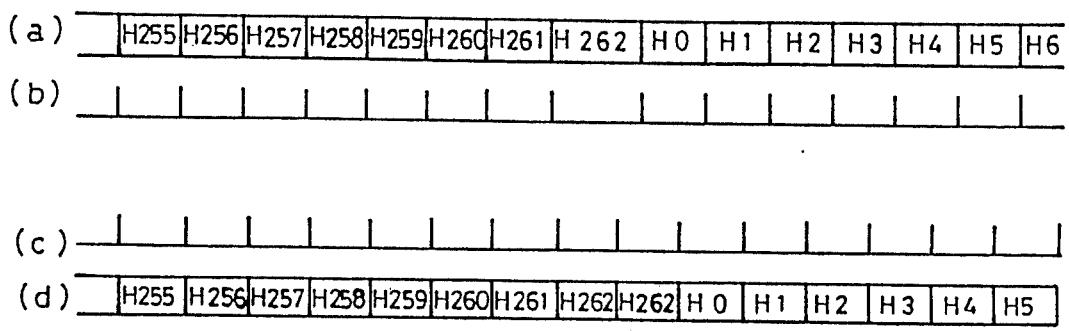
FIG. 11 is a timing chart for illustrating the writing operation of the memory 66 shown in FIG. 10.
Figure 12:
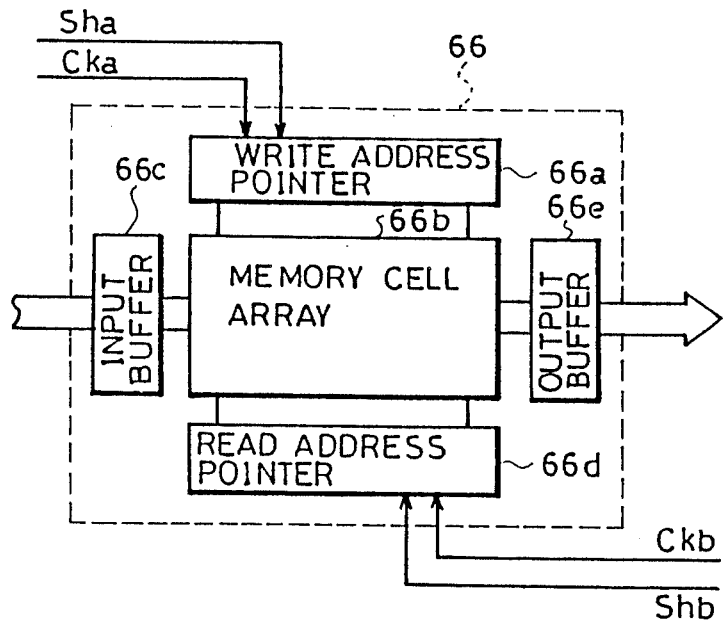
FIG. 12, (a)-(d), is a detailed block diagram of the memory 66 shown in FIG. 10.
Figure 10:
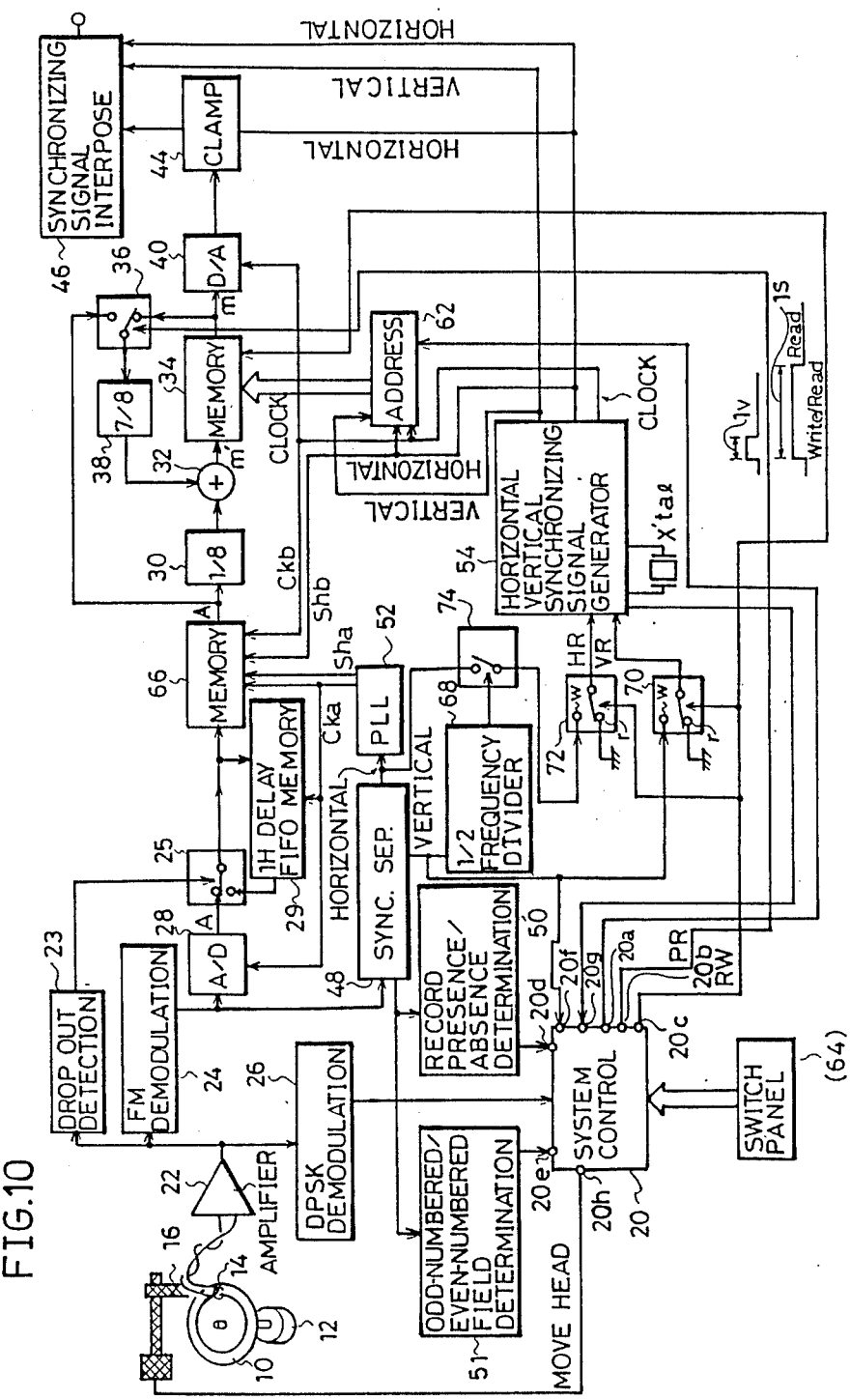
FIG. 10 is a block diagram showing another embodiment of the present invention.

FIG. 10 is a block diagram showing another embodiment of the present invention which is capable of eliminating such a problem. In the embodiment of FIG. 10, the same or corresponding portions with the embodiment shown in FIG. 1 are denoted by the same reference numerals and the description thereof will be omitted. The luminance signal which is digitized by the A/D converter 28 is input to the memory 66 through the switch 25. The memory 66 has the capacitance which is sufficient to store video signals of about 1 horizontal scanning period and the memory such as μPD41101C manufactured by NEC Corporation is used, for example. The memory 66 contains address generation circuits (66a, 66b in FIG. 12) respectively for writing (input) and reading (output), so that input and output can be carried out non-synchroneously. Therefore, it can be used in the similar manner as the FIFO memory, which is capable of non-synchroneous input/output of serial data. The PLL circuit 52 which is phase controlled by the horizontal synchronizing signal, separated and extracted by the synchronizing signal separating circuit 48, outputs the clock signal CKa in a similar manner as the embodiment shown in FIG. 1 and outputs a reset pulse Sha of 1H period shown in FIG. 11(b). Since the PLL circuit 52 operates in synchronization with the video signal of the field period reproduced from the magnetic disc, if the luminance signal of one field of the reproduction video signal, is the signal of the odd-numbered or even-numbered field of the 0th to 262nd horizontal scanning lines H0, ..., H262, then the reset pulse Sha deviates about 0.5H due to the deviation in phase in the synchronizing signal H at the junction of the last 262nd horizontal scanning line H262 of the one field of the video signal and the 0th horizontal scanning line H0 of the succeeding one field shown in FIG. 11(a). As shown in FIG. 12, in the memory 66, the writing address pointer 66a controls the writing of the memory cell array 66b by a field period based on the reset by the reset pulse Sha and the count of the clock signal CKa. On this occasion, the video signal output from the A/D converter 28 is successively written by about one horizontal scanning line in the memory cell array 66b through the input buffer 66c, with a skew generated between the 262nd horizontal scanning line H262 and the 0th horizontal scanning line H0.

Figure 13:
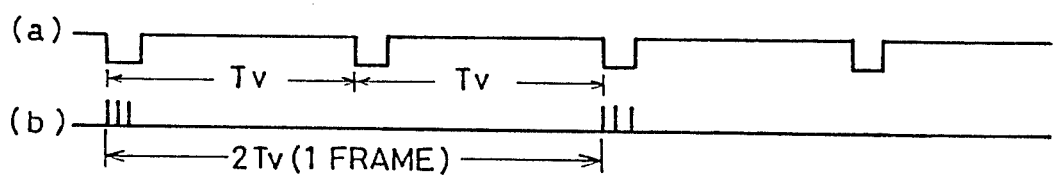
FIG. 13, (a), (b), is a timing chart for illustrating the reset control operation of the horizontal.vertical synchronizing signal generator 54 shown in FIG. 10.

Meanwhile, the vertical synchronizing signal output from the synchronizing signal separating circuit 48 is applied to the ½ frequency divider 21 and to the one input terminal w of the switch 70 for the vertical reset of the oscillator 54 which effects free running oscillation by frame period. The ½ frequency divider 68 divides the vertical synchronizing signal of one field period Tv shown in FIG. 13(a) and outputs the divided signal once in every one frame period in the vertical interval. Namely, the ½ frequency divider 68 outputs the signal having the same pulse width as the vertical synchronizing signal. The switch 74 for controlling the input of the horizontal synchronizing signal is turned on/off at every one field period Tv based on the divided signal. Therefore, several horizontal synchronizing signals are input at every one frame as shown in FIG. 13(b) to the one input terminal w of the switch 72 for horizontal resetting through the switch 74. The other input terminal r of each of the switches 70 and 72 is grounded. These switches 70 and 72 are on/off controlled by the control signal RW which is output from the output terminal 20c of the system control circuit 20. Namely, the switches 70 and 72 are switched to the input terminal w side in the writing/reading mode of memory 34 and switched to the input terminal r side in the subsequent read only mode.

Therefore, in the writing/reading mode, the oscillation frequency of horizontal.vertical synchronizing signal generator 54 is controlled based on the reset control by the vertical reset pulse VR output from the switch 70 (the vertical synchronizing signal separated and extracted from the reproduction video signal) and by the horizontal reset pulse HR output from the switch 72 (the horizontal synchronizing signal of every one frame shown in FIG. 13(b)). Namely, in the writing/reading mode, the horizontal.vertical synchronizing signal generator 54 oscillates in the frame period in synchronization with the reproduction video signal. The horizontal.vertical synchronizing signal generator 54 generates a clock pulse CKb and a vertical synchronizing signal as well as a reset pulse Shb of 1H period having no skew between fields (see FIG. 11(c)). The horizontal.vertical synchronizing signal generator 54 outputs the clock signal CKb and the reset pulse Shb to the reading address pointer 66d of the memory 66 shown in FIG. 12.

Therefore, the FIFO memory 66 is read controlled cyclically by the frame period in the writing/reading mode of the memory 34. Therefore, the video signal output from the output buffer 66e of the memory 66 to the ½ multiply circuit 30 becomes the signal of the frame period with the skew between the 262nd horizontal scanning line H262 and the 0th horizontal scanning line H0 being eliminated as shown in FIG. 11(d).

In order to prevent errors, the clock signal CKa and the clock signal CKb are approximately set at H/4 so that the time difference should not be 0 or 0.5H.

In addition, the correction of the jitter included in the reproduction video signal is also carried out based on the read time correction of the memory 66.

The rewriting operation of the memory 34 is carried out based on the video signal read from the memory 66. On this occasion, since the video signal is converted into the signal having the frame period by the memory 66, the address circuit 62 controls cyclically the writing/reading operation of the memory 34 by the frame period based only on the output of the horizontal.vertical synchronizing signal generator 54. Since the switch 42 shown in the embodiment of FIG. 1 is not provided in the embodiment of FIG. 10, the video signal read from the memory 34 is applied to the monitor TV (not shown) through the D/A converter 40, clamp circuit 44 and the synchronizing signal interposing circuit 46 during the rewriting operation of the memory 34. However, since the skew or jitter in the video signal read from the memory 34 has already been corrected by the memory 66, a clear image is displayed on the monitor TV. Thereafter, when the read only mode begins after the completion of the writing/reading mode, the switches 70 and 72 are respectively switched to the side of the input terminal r, that is, to ground. Therefore, the horizontal.vertical synchronizing signal generator 54 operates in the same manner as the horizontal.vertical synchronizing signal generator 54 shown in FIG. 1, whereby the one field video signals stored in the memory 34 are repeatedly read by the frame period as in FIG. 1. Therefore, video signals without skew or jitter are supplied to the monitor TV also in the reading.

Since the description was made mainly of the case in which the field recorded video signals are reproduced, it goes without saying that the processing can be carried out without any problem in the case of reproducing the frame recorded video signals.

Although the still picture processing apparatus mainly for the luminance signal of the video signals is shown in the above described embodiment, the same processing as in each of the above described embodiments may be carried out for a color signal.

Meanwhile, the noise reduction operation of the video signal by the rewriting of the memory 34 is preferably stopped during searching at high speed in which video images of each of the tracks are successively reproduced in each of the above described embodiments. The reason for this is that the noise reduction takes a large amount of time in searching.

When one track is to be reproduced for a long period of time, the pressure on the pressing plate (the plate for pressing the magnetic disc 10 onto the magnetic head 14) of the magnetic disc 10 should preferably be reduced and the rotation of the magnetic disc 10 should be preferably stopped after a prescribed time. By doing so, the magnetic disc 10 and the magnetic head 14 are protected.

Although a single head is used as the magnetic head in each of the above described embodiments, a double head may be used. In that case, two tracks can be simultaneously reproduced without moving the head during frame reproduction.

In addition, in reducing the noise of the video signals by rewriting the memory 34, the ratio of mixing the input video signal A and the output m of the memory 34 may be changed at every vertical scanning period. For example, although A and m are mixed with the proportion being $\frac{1}{2}$ versus $\frac{1}{2}$ in the embodiments, it may be $1/N+1$ versus $N/N+1$, where N is the number of circulation. In this case, the effect of noise reduction appears quickly, so that the number of rewritings of the memory 34 can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A still picture signal processing apparatus which stores a video signal of a still picture, reproduced from a recording medium, in a memory and supplies a still picture signal to a display apparatus by repeatedly reading stored contents of the memory, wherein said recording medium comprises a plurality of tracks arranged concentrically, the video signals of one field are independently recorded in each track or the video signals of one frame are recorded separately on two adjacent tracks, said still picture signal processing apparatus comprising:
   record presence/absence detection means for detecting whether a vide signal is recorded or not in a track, which is presently being reproduced, based on reproduction output from said recording medium;
   determining means for determining whether the track which is presently being reproduced is a field recorded-type track or a frame recorded-type track on a field/frame discriminating signal included in a reproduction signal reproduced from said recording medium; and
   control means for controlling writing of the video signal reproduced from said track into said memory based on the detection of said record presence/absence detection means and based on the result of the determination of said determining means, wherein
   said control means comprises a frame writing control means for controlling, after the video signal reproduced from one first track, constituting a first field of a frame recorded on two adjacent tracks of said recording medium, is written in said memory and when the video signal reproduced from a second adjacent track is processed, whether the reproduction video signal of the second adjacent track is written in said memory as the second field video signal constituting one frame together with the video signal of the first track which is stored in said memory, based on the result of the determination of said determining means.

2. A still picture signal processing apparatus according to claim 1, wherein
   said field/frame discriminating signal comprises information dependent on whether the track, which is an outer track or an inner track, can be discriminated when the track is frame recorded, and
   said frame writing control means determines whether the second adjacent track is the second field of the one frame, based on said information included in said field/frame discriminating signal.

3. A still picture signal processing apparatus according to claim 2, wherein
   said frame writing control means causes inhibiting of writing of the reproduction of the video signal from the second adjacent track in said memory in response to the determination that the second adjacent track is not the second field of the one frame.

4. A still picture signal processing apparatus according to claim 3, wherein
   said frame writing control means causes writing of the reproduction of the video signal from the second adjacent track in said memory in response to the determination that the second adjacent track is the second field of the one frame.

5. A still picture signal processing apparatus according to claim 1, further comprising
   read control means for controlling reading of the video signal of one frame or one field stored in said memory as a still picture signal of a frame period.

6. A still picture signal processing apparatus according to claim 5, wherein
   said read control means comprises means for controlling the read address of said memory based on the oscillation signal from a reference signal oscillator, wherein jitter included in the reproduction video signal can be corrected.

7. A still picture signal processing apparatus according to claim 1, further comprising
   memory rewriting means which, in writing said video signal in said memory by said control means, reads the video signal stored in said memory, mixes the same with the reproduction video signal in a prescribed proportion and rewrites the result in said memory, wherein said memory rewriting means rewrites the stored contents of said memory a plurality of times so that a video signal with reduced noise is finally stored in said memory.

8. A still picture signal processing apparatus according to claim 7, wherein said memory rewriting means initially writes the video signal reproduced from said track substantially as stored in said memory.

9. A still picture signal processing apparatus according to claim 7, wherein
   said memory rewriting means controls an address designation of said memory in synchronization with a synchronizing signal separated and extracted from the video signal reproduced from said track.

10. A still picture signal processing apparatus according to claim 1, further comprises:
    storage means, arranged in a preceding stage of said memory, for temporarily storing the reproduction video signal before the reproduction video signal is written in said memory; and reading control means for controlling reading of the video signal stored in said storage means as a still picture of one frame period.

11. A still picture signal processing apparatus according to claim 10, wherein said read control means is reset based on a synchronizing signal separated and extracted from the video signal reproduced from said track and controls the reading address of said storage means based on oscillation output of a reference signal oscillator, wherein a video signal which has no skew and jitter corrected is output from said storage means.

12. A still picture signal processing apparatus according to claim 1, wherein said control means causes reproduction of a track designated by an operation of an operating panel, and writing of the video signal reproduced from this track to a first region of said memory based of the detection of said record presence/absence detection means, and determines whether the adjacent track should be reproduced or not based on the result of the determination of said determining means and when it is determined that the adjacent rack should be reproduced, causes reproduction of the adjacent track and controls whether the video signal reproduced from the adjacent track should be written or not in a second region of said memory based on the result of the determination of said determining means.

* * * * *